(12) United States Patent
Kratmann

(10) Patent No.: US 9,957,953 B2
(45) Date of Patent: May 1, 2018

(54) ROOT BUSHING FOR A BLADE ROOT OF A WIND TURBINE ROTOR BLADE, A BLADE ROOT, A WIND TURBINE ROTOR BLADE AND A WIND TURBINE

(71) Applicant: Siemens Aktiengesellschaft, Munich (DE)

(72) Inventor: Kasper Koops Kratmann, Horsens (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 206 days.

(21) Appl. No.: 14/714,304

(22) Filed: May 17, 2015

(65) Prior Publication Data

US 2015/0354542 A1 Dec. 10, 2015

(30) Foreign Application Priority Data

Jun. 5, 2014 (EP) .................... 14171375

(51) Int. Cl.
*F03D 1/06* (2006.01)
*F16B 37/12* (2006.01)
(Continued)

(52) U.S. Cl.
CPC ........ *F03D 11/0008* (2013.01); *F03D 1/0658* (2013.01); *F03D 1/0675* (2013.01);
(Continued)

(58) Field of Classification Search
CPC .. F03D 11/0008; F03D 1/0658; F03D 1/0675; F03D 7/0224; F03D 3/062;
(Continued)

(56) References Cited

U.S. PATENT DOCUMENTS 2,560,961 A 7/1951 Friedrich
4,420,354 A 12/1983 Gougeon et al.
(Continued)

FOREIGN PATENT DOCUMENTS

EP 1486415 A1 12/2004
EP 1633624 A1 3/2006
(Continued)

OTHER PUBLICATIONS

Eurpoean Patent Office Third Party Observation communication dated Feb. 22, 2017, for EP application No. 20140171375/publication No. EP2952734A1.
(Continued)

*Primary Examiner* — Logan Kraft
*Assistant Examiner* — Peter T Hrubiec
(74) *Attorney, Agent, or Firm* — Beusse Wolter Sanks & Maire

(57) ABSTRACT

A root bushing for a blade root of a wind turbine rotor blade, including a cylindrical bushing body and a flat contact body is provided. The contact body is provided on a face of the bushing body. This has the advantage that due to the provision of the contact body, the contact area between the root bushing and the pitch bearing is increased. In another embodiment, the root bushing includes a central bore which protrudes through the bushing body and the contact body. In another embodiment, an outer wall of the bushing body is provided with a connection structure for connecting the root bushing to a composite material of the wind turbine rotor blade.

14 Claims, 4 Drawing Sheets

(51) Int. Cl.
*F03D 80/70* (2016.01)
*F03D 11/00* (2006.01)

(52) U.S. Cl.
CPC ............ *F03D 80/70* (2016.05); *F16B 37/122* (2013.01); *F05B 2230/50* (2013.01); *F05B 2250/61* (2013.01); *Y02E 10/721* (2013.01); *Y02P 70/523* (2015.11)

(58) Field of Classification Search
CPC .................. F03D 1/0691; F16B 37/122; F05B 2260/301; Y02E 10/722
USPC ....................................................... 290/44, 55
See application file for complete search history.

(56) References Cited

U.S. PATENT DOCUMENTS

| | | | |
|---|---|---|---|
| 4,915,590 A | 4/1990 | Eckland et al. | |
| 2011/0044817 A1 | 2/2011 | Bendel et al. | |
| 2012/0045339 A1 | 2/2012 | Fleming et al. | |
| 2012/0315143 A1 | 12/2012 | Grove-Nielsen | |
| 2013/0330197 A1 | 12/2013 | Feigl | |
| 2014/0030096 A1* | 1/2014 | Dahl | B29C 70/86 416/217 |
| 2015/0071701 A1* | 3/2015 | Raina | F16B 11/006 403/266 |
| 2017/0045032 A1* | 2/2017 | Jacobsen | F03D 1/0658 |

FOREIGN PATENT DOCUMENTS

| | | |
|---|---|---|
| EP | 2078851 A1 | 7/2009 |
| WO | 03082551 A1 | 10/2003 |
| WO | 2006070171 A1 | 7/2006 |
| WO | 2009132612 A1 | 11/2009 |
| WO | 2012140039 A2 | 10/2012 |
| WO | 03057457 A | 5/2013 |
| WO | 2015034708 A1 | 3/2015 |

OTHER PUBLICATIONS

EP Article 94(3) communication dated May 15, 2017, for EP patent application No. 14171375.0.
EPO Third-Party-Observation dated Jan. 25, 2018, for EP patent application No. 14171375.0.

* cited by examiner

ROOT BUSHING FOR A BLADE ROOT OF A WIND TURBINE ROTOR BLADE, A BLADE ROOT, A WIND TURBINE ROTOR BLADE AND A WIND TURBINE

CROSS REFERENCE TO RELATED APPLICATIONS

This application claims the benefit of European Application No. EP14171375, filed Jun. 5, 2014, incorporated by reference herein in its entirety.

FIELD OF INVENTION

The present invention relates to a root bushing for a blade root of a wind turbine rotor blade, to a blade root, to a wind turbine rotor blade and to a wind turbine.

BACKGROUND OF INVENTION

Modern wind turbine rotor blades are built from fiber-reinforced plastics. A rotor blade typically includes an airfoil having a rounded leading edge and a sharp trailing edge. The rotor blade is connected with its blade root to a hub of the wind turbine. The blade root includes a plurality of root bushings. The root bushings can be provided with an internal thread. Bolts are engaged with theses threads to connect the blade root to the hub. EP 1 486 415 A1 describes such a root bushing. A connection between the root bushing and a pitch bearing of the hub is a friction connection. The quality of this connection is dependent on the contact area between the root bushing and the pitch bearing.

SUMMARY OF INVENTION

It is one object of the present invention to provide an improved root bushing for a blade root of a wind turbine rotor blade.

Accordingly, a root bushing for a blade root of a wind turbine rotor blade is provided. The root bushing includes a cylindrical bushing body and a flat contact body, wherein the contact body is provided on a face of the bushing body.

In particular, the contact body is provided on a front or distal face of the bushing body. The contact body is preferably connected to the face of the bushing body. The root bushing is advantageous in that due to the provision of the contact body, the contact area between the root bushing and the pitch bearing is increased. In contrast to known root bushings, higher forces can thus be transmitted via the friction connection between the root bushing and the pitch bearing. Further, since the contact area is enlarged, an easier positioning of the root bushing relatively to the pitch bearing is ensured.

According to an embodiment, the contact body has a ring-segment shape. Since the contact body is wider and higher than the bushing body, the contact area between the contact body and the pitch bearing is increased. So, the root bushing provides a greater bending stiffness. The contact body may alternatively have a trapezoidal or a rectangular shape.

According to a further embodiment, the bushing body has a rectangular shape. Preferably, the bushing body has a half rectangular and half circular cross-section.

According to a further embodiment, a cross-sectional area of the contact body is bigger than a cross-sectional area of the bushing body. Preferably, the cross-sectional area of the contact body is at least 1.5 to 4 times bigger than the cross-sectional area of the bushing body.

According to a further embodiment, the root bushing includes a central bore which protrudes through the bushing body and the contact body. The bore preferably has a circular cross-section. A foam core can be placed at least partly in the bore.

According to a further embodiment, the central bore includes a thread. To connect the root bushing to a hub of a wind turbine, a bolt can be engaged with the thread.

According to a further embodiment, the bushing body is arranged perpendicular to the contact body. "Perpendicular" in this context preferably refers to an angle of 90°±10°, more preferably to an angle of 90°±5°, more preferably to an angle of 90°±3° and more preferably to an angle of exact 90°.

According to a further embodiment, an outer wall of the bushing body is provided with a connection structure for connecting the root bushing to a composite material of the wind turbine blade. The connection structure or texture enables an improved connection to the blade composite material, in which the root bushing is to be casted.

According to a further embodiment, the connection structure has notches that are arranged on a circumference of the bushing body. The notches may be triangular, rectangular, sinusoidal or the like. In particular, the notches surround the bushing body completely.

According to a further embodiment, the bushing body has a first face and a second face, wherein the contact body is provided at the first face and wherein the second face is tapered. Preferably, the bushing body has a basic portion and an extension portion which is slanted and has a gradually reduced cross-section to a pointed or nearly pointed end. Thus, the extension portion has a gradually increased flexibility.

According to a further embodiment, the bushing body and the contact body are made of one piece. This results in a high durability of the root bushing. Alternatively, the contact body and the bushing body might be welded together.

According to a further embodiment, the root bushing is made of a metal alloy. The root bushing preferably is made of "ductile iron". This material has a high impact and fatigue resistance due to its nodular graphite inclusions. One type of this material is the so-called ADI (austempered ductile iron).

Further, a blade root of a wind turbine rotor blade including such a root bushing is provided. The blade root may comprise only one or a plurality of root bushings.

Further, a wind turbine rotor blade including such a root bushing and/or such a blade root is provided.

Further, a wind turbine including such a root bushing, such a blade root and/or such a wind turbine rotor blade is provided.

"Wind turbine" presently refers to an apparatus converting the wind's kinetic energy into rotational energy, which may again be converted to electrical energy by the apparatus.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of the embodiments of the invention provided herein.

BRIEF DESCRIPTION OF THE DRAWINGS

Further embodiments, features and advantages of the present invention will become apparent from the subsequent description and dependent claims, taken in conjunction with the accompanying drawings, in which:

DETAILED DESCRIPTION OF INVENTION

Figure 1:
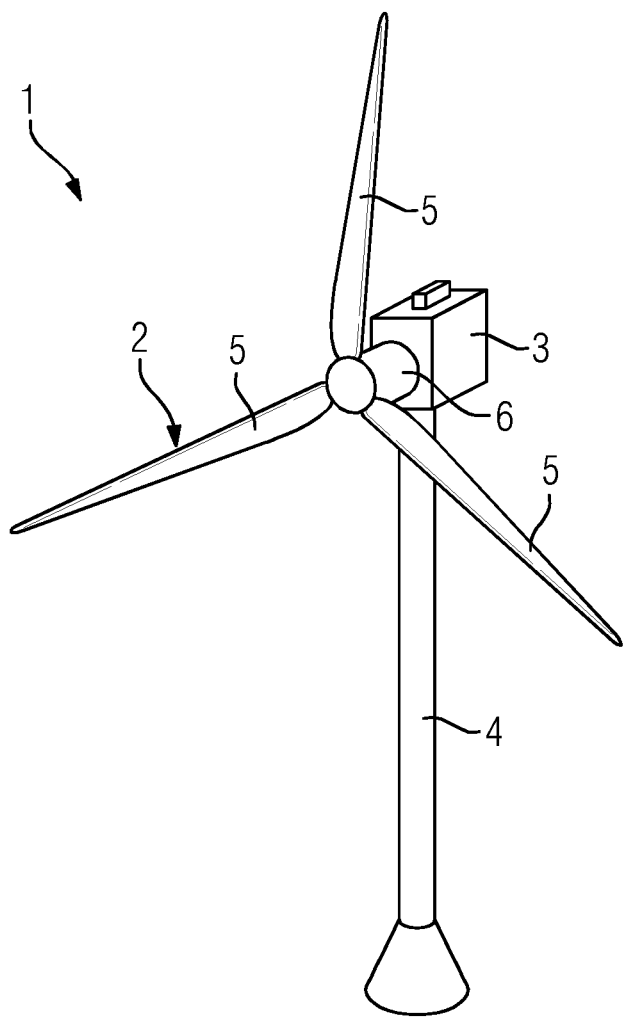
FIG. 1 is a perspective view of a wind turbine according to one embodiment.

In the Figures, like reference numerals designate like or functionally equivalent elements, unless otherwise indicated.

FIG. 1 shows a wind turbine 1 according to an embodiment.

The wind turbine 1 includes a rotor 2 connected to a generator (not shown) arranged inside a nacelle 3. The nacelle 3 is arranged at the upper end of a tower 4 of the wind turbine 1.

The rotor 2 includes three blades 5. The blades 5 are connected to a hub 6 of the wind turbine 1. Rotors 2 of this kind may have diameters ranging from, for example, 30 to 160 meters. The blades 5 are subjected to high wind loads. At the same time, the blades 5 need to be lightweight. For these reasons, blades 5 in modern wind turbines 1 are manufactured from fiber-reinforced composite materials. Therein, glass fibers are generally preferred over carbon fibers for cost reasons. Oftentimes, glass fibers in the form of unidirectional fiber mats are used.

Figure 2:
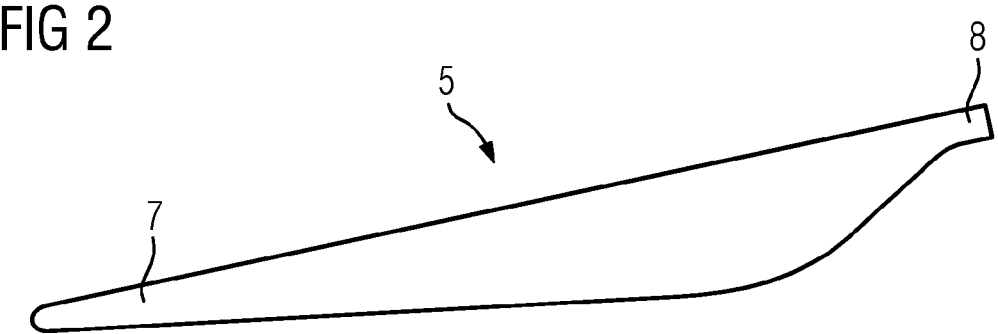
FIG. 2 is a perspective view of a wind turbine rotor blade according to one embodiment.

FIG. 2 shows a blade 5 according to one embodiment.

The blade 5 includes an aerodynamically designed portion 7, which is shaped for optimum exploitation of the wind energy and a blade root 8 for connecting the blade 5 to the hub 6. The blade 5 may be fixed to the hub 6 by means of bolts.

Figure 3:
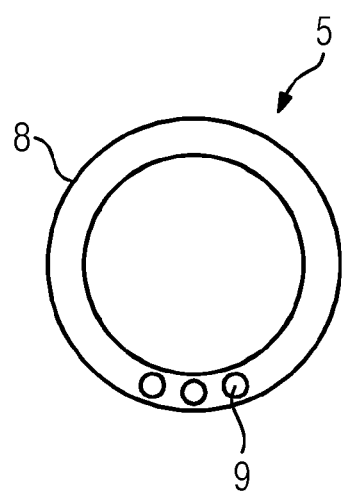
FIG. 3 is an end view of the wind turbine rotor blade according to FIG. 2.

FIG. 3 shows an end view of the blade root 8.

The blade root 8 includes a plurality of root bushings 9 for a releasable connection of the blade 5 to the hub 6. The root bushings 9 are embedded in the blade root 8 so that bolts (not shown) can be screwed into an internal thread of the root bushings 9 for a firm but releasable engagement therewith. The number of root bushings 9 is arbitrarily. In FIG. 3 only three root bushings 9 are shown.

Figure 4:
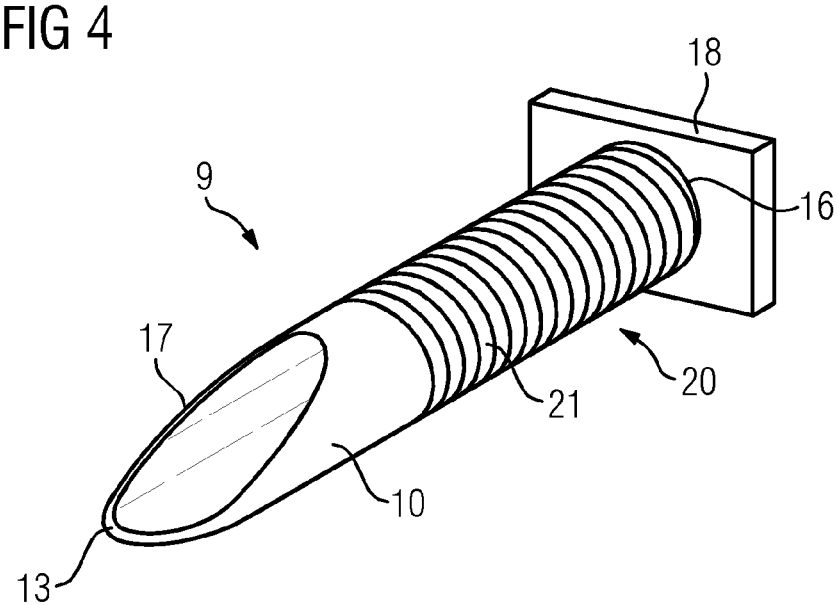
FIG. 4 is a perspective view of a root bushing according to one embodiment.
Figure 5:
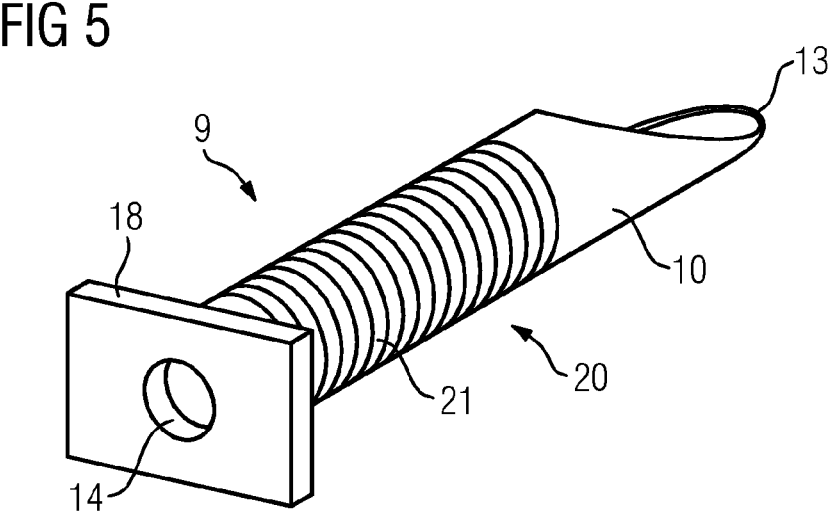
FIG. 5 is another perspective view of the root bushing according to FIG. 4.
Figure 6:
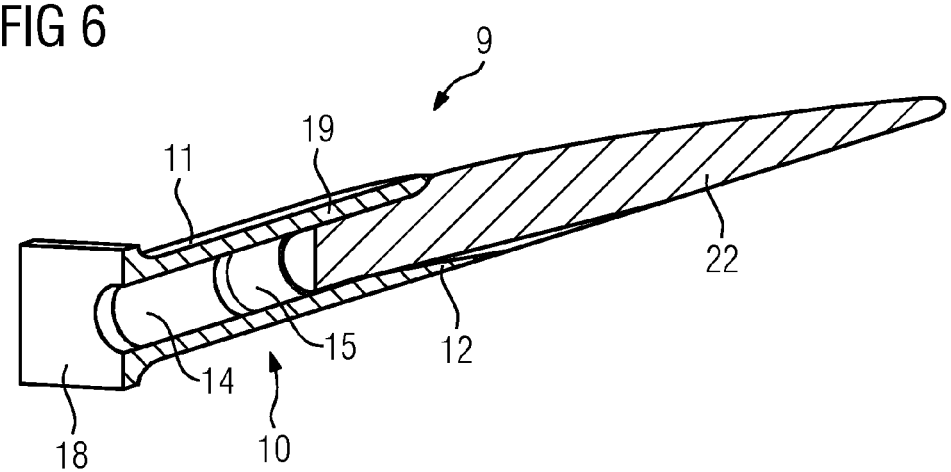
FIG. 6 is a cross-sectional view of the root bushing according to FIG. 4.

FIGS. 4 and 5 are perspective views of a root bushing 9. FIG. 6 is a longitudinal section of a root bushing 9.

In the following, FIGS. 4 to 6 are referred to at the same time. The root bushing 9 includes a bushing body 10. The bushing body 10 includes a basic portion 11 and an extension portion 12. The basic portion 11 is cylindrical or tube shaped. The basic portion 11 preferably has a half square half circular or rectangular cross-section. The extension portion 12 is slanted and has a gradually reduced cross-section to a pointed or nearly pointed end 13. Thus, the extension portion 12 has a gradually increased flexibility. Preferably, the basic portion 11 and the extension portion 12 are made of one piece.

The bushing body 10 has a half square half circular or rectangular cross-section with a central bore 14. The central bore 14 includes a thread 15 for connecting the bushing body 10 to the hub 6 by means of a bolt (not shown). The bushing body 10 has two faces 16, 17. The face 16 is a first or distal face 16 of the bushing body 10 and the face 17 is a second or proximal face 17 of the bushing body 10. The second face 17 is tapered and pointed to the end 13.

The root bushing 9 further includes a contact body 18. The contact body 18 provides an interface between a pitch bearing (not shown) of the hub 6 and the root bushing 9. The contact body 18 is provided on the face 16 of the bushing body 10. In particular, the contact body 18 is connected to the front face 16. The central bore 14 protrudes through the contact body 18 and the bushing body 10. The bushing body 10 and the contact body 18 are made of one piece.

The contact body 18 is flat or even and has a ring-segment shape. Alternatively, the contact body 18 may have a trapezoidal or even a rectangular cross-section, wherein a cross-sectional area of the contact body 18 is bigger than a cross-sectional area of the bushing body 10. The bushing body 10 is arranged perpendicular to the contact body 18. For simplification, in FIGS. 4 to 6 the contact body 18 is shown with a rectangular shape.

An outer wall 19 of the root bushing body 10 is provided with a connection structure 20 for connecting the root bushing 9 to a composite material of the wind turbine blade 5. The connection structure 20 has a plurality of notches 21 that are arranged on a circumference of the bushing body 10. The connection structure 20 increases a surface of the outer wall 19. A foam core 22 can be placed in the bushing body 10, in particular in the central bore 14. Due to the connection structure 20, the connection between the root bushing 9 and the composite material is improved.

Figure 7:
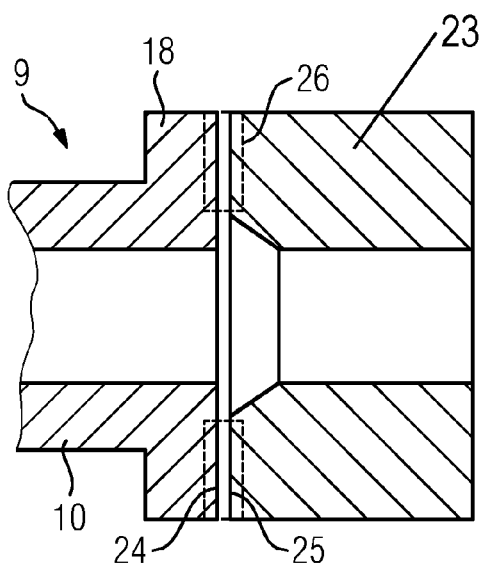
FIG. 7 is a cross-sectional view of a pitch bearing according to one embodiment.

FIG. 7 shows a sectional view of a pitch bearing 23 of the hub 6.

The contact body 18 has a face 24 which directly contacts a face 25 of the pitch bearing 23. Due to the fact that the contact body 18 has a bigger cross-sectional area than the bushing body 10, a contact area 26 which is framed with dotted lines for a better understanding is increased in comparison to known root bushings. In FIG. 7 the root bushing 9 is shown with an offset from the pitch bearing 23. Normally, the contact body 18 is firmly pressed against the pitch bearing 23. The contact area 26 has a ring-segment shape.

The root bushing 9 also provides an increased bending stiffness since the cross-section of the contact body 18 is wider and higher than that of the root bushing body 10. Since the contact area 26 is enlarged, an easier positioning of the root bushing 9 relatively to the pitch bearing 23 is ensured. The increased contact area 26 increases connection stiffness and bending stiffness of the assembly which both increase fatigue life of the connecting bolt.

Although the present invention has been described in accordance with preferred embodiments, it is obvious for the person skilled in the art that modifications are possible in all embodiments.

REFERENCE NUMERALS 1 wind turbine
2 rotor
3 nacelle
4 tower
5 blade
6 hub
7 portion
8 blade root 9 root bushing
10 bushing body
11 basic portion
12 extension portion
13 end
14 bore
15 thread
16 face
17 face
18 contact body
19 wall
20 connection structure
21 notch
22 foam core
23 pitch bearing
24 face
25 face
26 contact area.

The invention claimed is:

1. A root bushing for a blade root of a wind turbine rotor blade, comprising
a cylindrical bushing body, and
a flat contact body comprising a rectangular shape,
wherein the contact body is provided on a face of the bushing body,
wherein a cross-sectional area of the contact body is bigger than a cross-sectional area of the bushing body,
wherein the bushing body has a first face and a second face, wherein the contact body is provided at the first face, and wherein the second face comprises a taper that reduces a cross section of the bushing body with increased distance from the first face,
wherein an outer wall of the bushing body comprises notches configured to connect the root bushing to a composite material of the wind turbine rotor blade, and
wherein the notches end prior to the second face and prior to the taper.

2. The root bushing according to claim 1, wherein the bushing body comprises a rectangular cross section.

3. The root bushing according to claim 1, wherein the root bushing comprises a central bore which protrudes through the bushing body and the contact body.

4. The root bushing according to claim 3, wherein the central bore comprises a thread.

5. The root bushing according to claim 1, wherein the bushing body is arranged perpendicular to the contact body.

6. The root bushing according to claim 1, wherein the bushing body and the contact body are made of one piece.

7. The root bushing according to claim 1, wherein the root bushing is made of a metal alloy.

8. A blade root of a wind turbine rotor blade, comprising a root bushing according to claim 1.

9. A wind turbine rotor blade comprising a blade root according to claim 8.

10. A wind turbine comprising a blade root according to claim 8.

11. A wind turbine rotor blade comprising a root bushing according to claim 1.

12. A wind turbine comprising a wind turbine rotor blade according to claim 11.

13. A wind turbine comprising a root bushing according to claim 1.

14. The root bushing according to claim 1, wherein the notches surround the bushing body completely.

* * * * *